(12) United States Patent
Huynh et al.

(10) Patent No.: US 8,630,392 B2
(45) Date of Patent: Jan. 14, 2014

(54) WORLD CLOCK ENABLING TIME ZONE SENSITIVE APPLICATIONS

(75) Inventors: Dat Huynh, Ottawa (CA); Abid Ali Shaikhali, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 304 days.

(21) Appl. No.: 12/804,885

(22) Filed: Jul. 30, 2010

(65) Prior Publication Data

US 2012/0027188 A1    Feb. 2, 2012

(51) Int. Cl.
*H04M 1/64* (2006.01)

(52) U.S. Cl.
USPC ............... 379/88.19; 379/88.21; 379/128; 379/207.13; 340/5.63

(58) Field of Classification Search
USPC ............... 379/88.03, 93.23, 201.1, 207.12, 379/355.09, 88.19–88.21, 118, 120, 127.01, 379/127.08, 128, 183, 207.13–207.15, 440; 700/16; 702/178; 340/5.63
See application file for complete search history.

(56) References Cited

U.S. PATENT DOCUMENTS

| | | | |
|---|---|---|---|
| 6,424,711 B1 * | 7/2002 | Bayless et al. | 379/355.09 |
| 7,801,284 B1 * | 9/2010 | Chakra et al. | 379/88.03 |
| 2005/0175172 A1 * | 8/2005 | Janssen | 379/440 |
| 2007/0088818 A1 | 4/2007 | Roberts et al. | |
| 2007/0088839 A1 | 4/2007 | Yoakum | |
| 2008/0153474 A1 | 6/2008 | Scott | |
| 2010/0184419 A1 | 7/2010 | Othmer | |

FOREIGN PATENT DOCUMENTS

| | | | |
|---|---|---|---|
| WO | WO/2007134623 | A1 | 11/2007 |
| WO | WO/2007134623 | A1 | 11/2007 |

OTHER PUBLICATIONS

U.S. Appl. No. 12/587,668, filed Oct. 10, 2009, Mitel Networks.

* cited by examiner

*Primary Examiner* — Md S Elahee

(57) ABSTRACT

The present application relates to software on phones for displaying local times of distant parties as to allow users of the software to shape their behavior based on the social and business expectations related to those local times. Local times are retrieved by communicating with a directory number information service. The directory number information service can receive a user identifier from a phone application identifying a remote party. The service can retrieve a location of the remote party identified by the user identifier. The service can determine a local time of the remote party based on the remote party's location and provide the local time to the phone application for display. Social statuses can also be provided. The phone can create a call log for incoming calls made by remote parties. The calculated local time can be used for updating software on the phones.

15 Claims, 7 Drawing Sheets

WORLD CLOCK ENABLING TIME ZONE SENSITIVE APPLICATIONS

TECHNICAL FIELD

This application generally relates to phones, and more particularly, to an information service that provides the local times of remote parties to a user so that the user can determine whether making calls to the remote parties would be appropriate.

BACKGROUND

Previously, collaboration over long distances entailed either significant delay or great costs. Collaboration by postal mail correspondence has long been available. However, this collaboration had to adapt itself to delays of several days or weeks between individual interactions. Long distance telephone calls were also used, but until recently considered expensive and because of this cost unsuited to routine collaboration. With the advancement of technology, interactive and synchronous multimedia interactions are now routinely possible over the Internet at minimal cost. With these developments, the 'death of distance' was proclaimed with world wide collaborations now possible with minimal expense and supposedly minimal inconvenience.

The inconvenience of such long distance collaborations nevertheless has moved from the cost and difficulty in creating connections to the realization that the world is round and people live long distances apart as such live in different time zones and have different customs. The same physical universal time of day can find people in Europe and North America in entirely different portions of their daily activities and social expectations. Collaborations between people in Paris and Los Angeles therefore have to take into account that these locations are in time zones that are eight hours apart. As such, someone just arriving at work at 9:00 AM in Los Angeles will discover that a potential collaborator in Paris is about to leave work at 5:00 PM. Since their business days overlap only slightly, the possibility of unplanned spontaneous interactions is greatly diminished compared to collaborators who live in the same time zone.

Today, these issues are only made worse by the provision of personal devices and 'one number' services that can find a person no matter where they are. Such devices and services have led to the development of mobile workers who are always in touch with their office and collaborators. Mobile workers with long distance air travel can move from time zone to time zone very quickly. For example, someone in Los Angeles can make a routine call to someone that they believe is in the same city only to discover that their colleague is in Paris where it is 11:00 PM.

It would thus be desirable to provide applications which are sensitive to the differences in expectations and acceptable behavior between time zones. Customarily, it would be unacceptable to call someone at 11:00 PM or later on a business matter except in the most urgent of situations. Current systems can cause this to be done inadvertently. Applications to enable users to be sensitive to other relative time zones are then clearly desirable. As well, it would be desirable if these applications did not require overt action by a caller since it would routinely be neglected.

In addition to those reasons presented above, the time that a call has been made can be used to judge its relative importance. For example, a call that is received at 11:00 PM local time would be considered to be very important. However, if the call is received at 3:00 PM local time, then this indication of importance can be lost. The present application will address this problem of user and machine collaboration across time zones.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

The present application generally relates to software on phones for displaying local times of distant parties to allow users of the software to shape their behavior based on the social and/or business expectations associated with those local times. In one illustrative embodiment, local times are retrieved by communicating with a directory number information service. The directory number information service can receive a directory number from a phone application identifying a remote party. In turn, the service can retrieve a location of the remote party identified by the directory number. The service can determine a local time of the remote party based on the remote party's location and provide the local time to the phone application for display. A social status can also be displayed. In one embodiment, the phone can create a call log for incoming calls made by the remote parties. The call logs can reference the local times of the remote parties, instead of the time on the phone. The call log can be used to monitor missed calls, accepted calls, or voicemails. In one embodiment, the calculated local time can be used for updating software on the user phone.

While described primarily as a software application above, those skilled in the relevant art will appreciate that the embodiments presented herein can also be implemented in software, hardware, or a combination of software and hardware. Furthermore, the embodiments described above can be implemented in separate configurations or in combination. Those skilled in the relevant art will appreciate that those embodiments can take the form of numerous interfaces for creating an optimal user feel.

The present application will show the detection of a local time of a distant party along with representative applications which illustrate its use. The use of the local time by the distant party within an automatic application will also be illustrated. The use of a physical local time and of a social time responsive to human expectations will also be shown below. Numerous other embodiments will become apparent from the description provided below.

Figure 1:
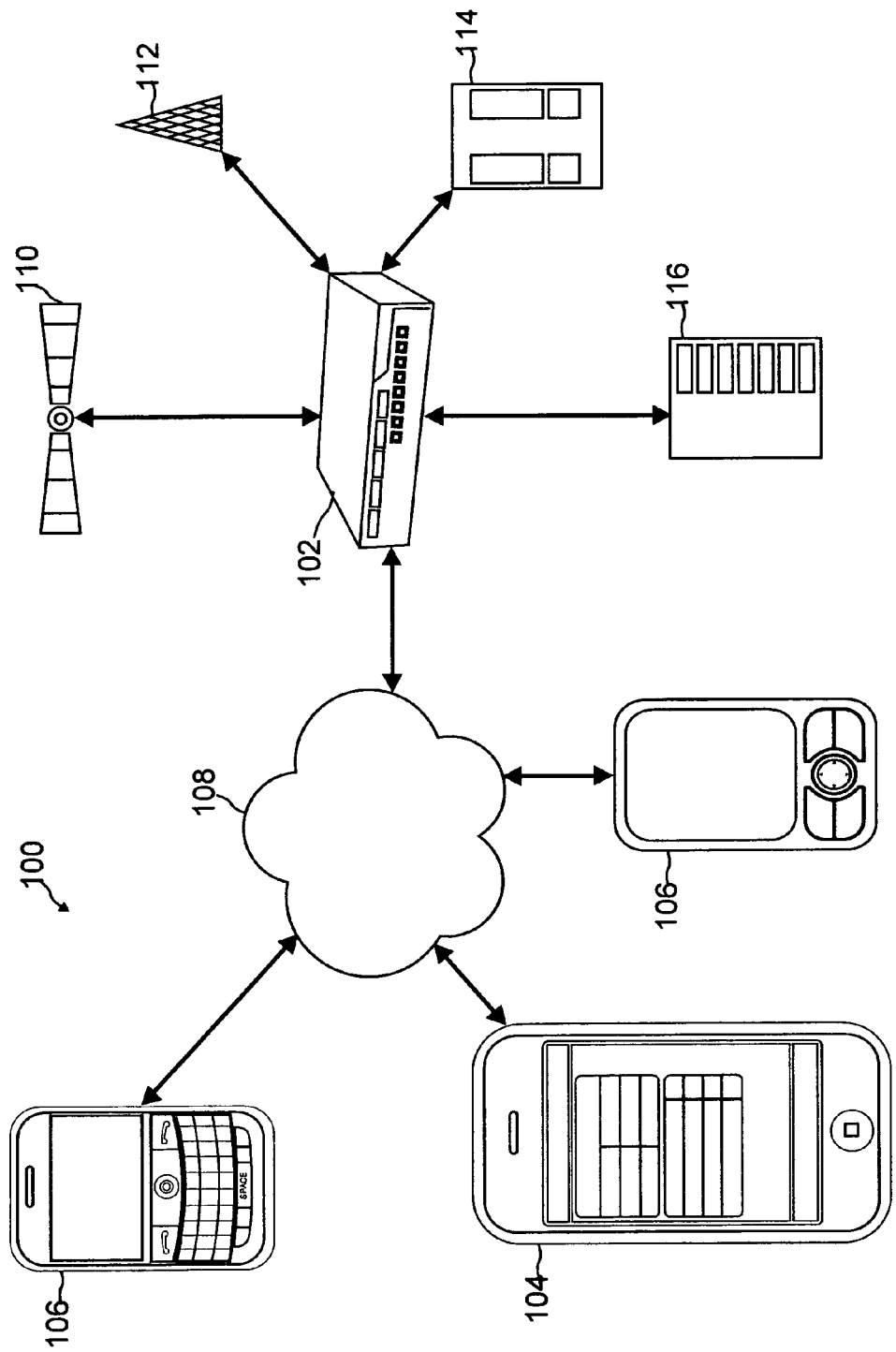
FIG. 1 depicts a typical operating environment for the directory number information service in accordance with one aspect of the present application.

The phone described above can display the local time and/or social status of a number of parties operating remote communication devices who are either within the user's speed dial, phone book, or other client application. The time of day can be explicit and/or take the form of a social indication. From there, the user can determine how to apply that information and whether to call the party based on their local time. As depicted in FIG. 1, a typical operating environment 100 for the directory number information service 102 in accordance with one aspect of the present application is provided. Those skilled in the relevant art will appreciate that fewer or more components can be used within the environment 100 and those components described herein are for purposes of illustration and should not be construed as limiting to the present application.

The directory number information service 102 can be accessed by a phone 104 through a communication network 108. The directory number information service 102 can communicate with the phone 104, as well as other shown components, through logical connections. These logical connections can be achieved by a communication device coupled to or integral with the directory number information service 102. The directory number information service 102 can be a server, a router, a network personal computer, a client, a peer device, or other common network node, and typically includes many or all of the elements associated with a standard server such as processors and memory operatively coupled to the processor for storing program instructions that when executed by the processor causes the processor to perform procedures.

In one embodiment, the directory number information service 102 can be a website operating on a web server. The directory number information service 102 can be associated with a well known uniform resource locator (URL) that allows one of any number of applications to submit queries to it and receive replies in return. These queries can take the form of a unique identifier for a user. The expected reply can consist of information regarding the local time at the user's location and, in some embodiments, information regarding the social significance of that time. In one embodiment, the unique identifier for the user could be the user's session initiation protocol (SIP) address. The query could take the form of a SIP subscription request that identifies the user and indicates that notifications regarding the user's current time is requested. The reply can take the form of a SIP notification message with the body consisting of an XML document containing the indicated time information.

The operations of querying the directory number information service 102 and receiving a response described above represents one embodiment. Known to those in the relevant art, the operations can occur entirely synchronously. Alternatively, queries and responses can be asynchronous. The directory number information service 102 can respond to queries, for example, either periodically or when a change in location is detected. In one embodiment, the query can be cancelled by the user of the phone 104 or when the query times out. The directory number information service 102 can provide monitoring features for adjusting the asynchronous communications.

Through the communication network 108, the web services provided by the directory number information service 102 can be accessed. The communication network 108 can be a local area network (LAN), wide area network (WAN), personal area network (PAN), campus area network (CAN), metropolitan area network (MAN), or global area network (GAN). Such communication networks 108 are commonplace in enterprise-wide computer networks, intranets and the Internet, which are all types of networks.

Figure 2:
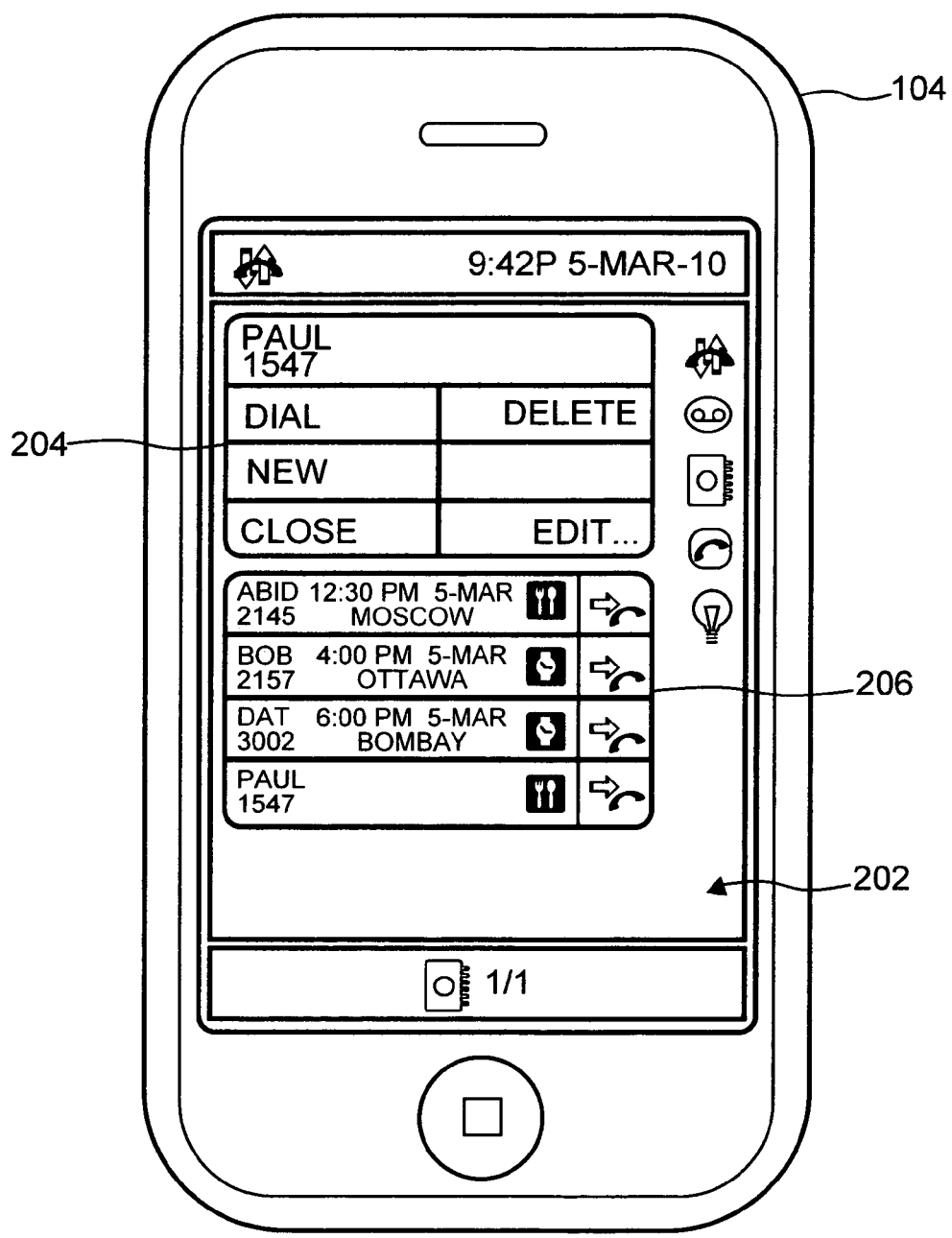
FIG. 2 illustrates an exemplary application showing a local time and social status of a number of parties in accordance with one aspect of the present application.

With reference now to the phone 104, FIG. 2 illustrates an exemplary application showing a local time and social status of a number of parties in accordance with one aspect of the present application. The phone 104 can include a screen 202 for viewing information. In one embodiment, the screen 202 can use touch pad capabilities for receiving input. On the screen 202, a user area 204 can be provided that displays the user's name and several options. These options can include placing a call. The user area 204 can allow the selection of different applications that can be run on the phone 104. The user can also add contacts, delete them, and edit them through the user area 204.

The screen 202 can also include a local time area 206. This area 206 can provide the local times of other parties. As shown within FIG. 2, the area 206 can provide the party's extension number along with their name. The local time of the party can be displayed along with their social status and location. The social status can generally be based on the time of the party. Next to that information, an option is provided that allows the user to call the party directly. FIG. 2 represents one embodiment where the time, social status, and location can be shown. Those skilled in the relevant art will appreciate that other types of interfaces can be provided and is not limited to that shown.

Returning to FIG. 1, a number of other communication devices 106 are shown. The directory number for these communication devices 106 can be stored within client applications on the phone 104 having the primary line directory number. In one embodiment, the user of the primary phone 104 can set up their account to reference the other communication devices 106. Typically, the user will know those persons associated with the communication devices 106, for example, the users are coworkers, friends, family, etc. These communication devices 106 are shown as mobile phones, but can include other types of phones such as cellular phone, a smart phone, a softphone, an IP desk phone, a teleworker IP phone, or a residential phone.

To obtain the location, local time, or status information of the users of those communication devices 106, the directory number information service 102 can be used. The directory number information service 102 can obtain the requested information by accessing other network entities. Typically, these entities are remote from the directory number information service 102. Alternatively, the entities can be part of the directory number information service 102. These entities can include a global positioning service 110 and/or location service 112, a time service 114, and a class of service/schedule 116. These can be implemented as web services and be accessible through well known URLs. As with the directory number information service 102, these services can make their information accessible through the SIP subscribe/notify system.

The environment 100 above represents one embodiment. Those skilled in the relevant art will appreciate that the depicted environment 100 is exemplary, but not limiting. In typical operations, the phone 104 presented herein having the primary line can display the location, time, and social status of a user of a stored directory number associated with a communication device 106. This information can be used by the user of the phone 104 in a variety of ways including whether to make a call to the user of the communication device 106.

Figure 3:
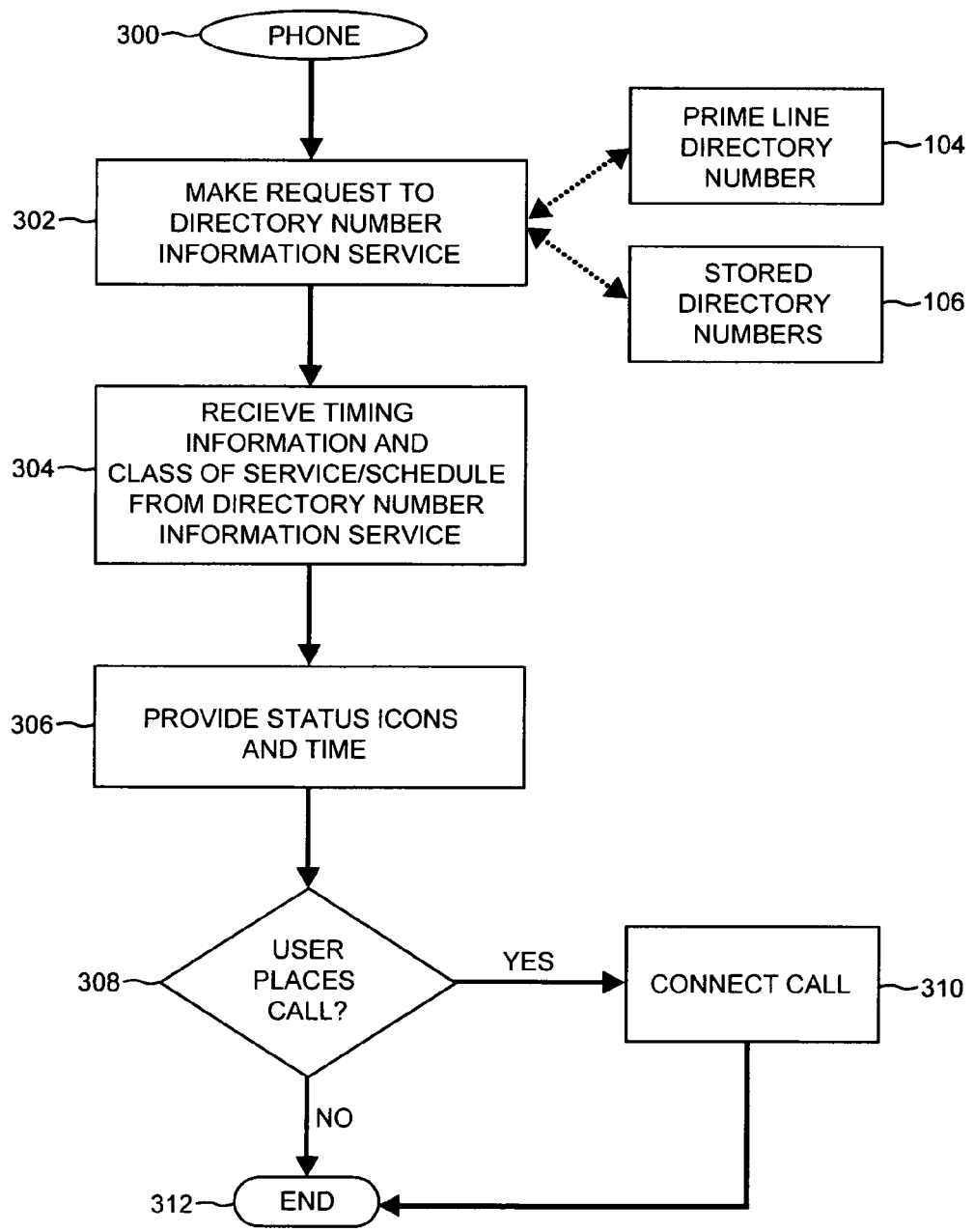
FIG. 3 is a flow chart showing exemplary processes performed by the phone for retrieving the local time and/or the social status of other parties in accordance with one aspect of the present application.

With reference now to FIG. 3, a flow chart showing exemplary processes performed by the phone 104 for retrieving the local time and/or the social status of other parties in accordance with one aspect of the present application is provided. Those skilled in the relevant art will appreciate that fewer or more processes can be used for retrieving the information and displaying it on the screen 202 within the local time area 206 of the phone 104.

The processes described below, beginning at block 300, represent retrieving timing information for a single remote party. The directory number information service 102 can also be used to retrieve timing information for a plurality of remote parties using one or many queries, which will become apparent from the description provided below.

At block 302, a request can be made to the directory number information service 102 for the local time and/or social status 116 of a number of parties. As shown in FIG. 1, the phone 104 can use its primary line directory number to access the directory number information service 102. By sending the primary line directory number, the phone 104 can track its own time as well as access information off the directory number information service 102. In one embodiment, the primary line directory number can be sent with information to verify whether the user of the phone 104 has access to the directory number information service 102. Stored directory numbers associated with the remote communication devices 106 can also be sent in the request to the directory number information service 102.

At block 304, the phone 104 can receive timing information and/or class of service/schedule 116 from the directory number information service 102. The timing information can represent a local time of the communication device 106. In one embodiment, the timing information can be offsets between the primary line directory number and the stored directory number. The offset can also represent times between separate communication devices 106. The offsets can be turned into local times for the communication devices 106 by the phone 104.

The class of service/schedule 116 can provide the status of the user operating the communication device 106. Status information can include whether the local time of the user is in the early morning, morning, afternoon, late afternoon, or night. In one embodiment, status information can include whether the party is at work, lunch, or outside of work. At block 306, status icons and the time of the stored directory numbers can be provided to the user. Graphics can be displayed on the phone 104 indicating the status. This information can be displayed on the screen 202 within the local time area 206 as shown in FIG. 2.

In one embodiment, the location of the communication device 106 can also be displayed. This information can be received from the directory number information service 102. At decision block 308, a determination on whether the user places a call can be made. Typically the user makes the determination based on the provided status icons and time. When the user places a call, the phone 104 can connect the call to one of the selected communication devices 106. The processes can end at block 312.

Figure 4:
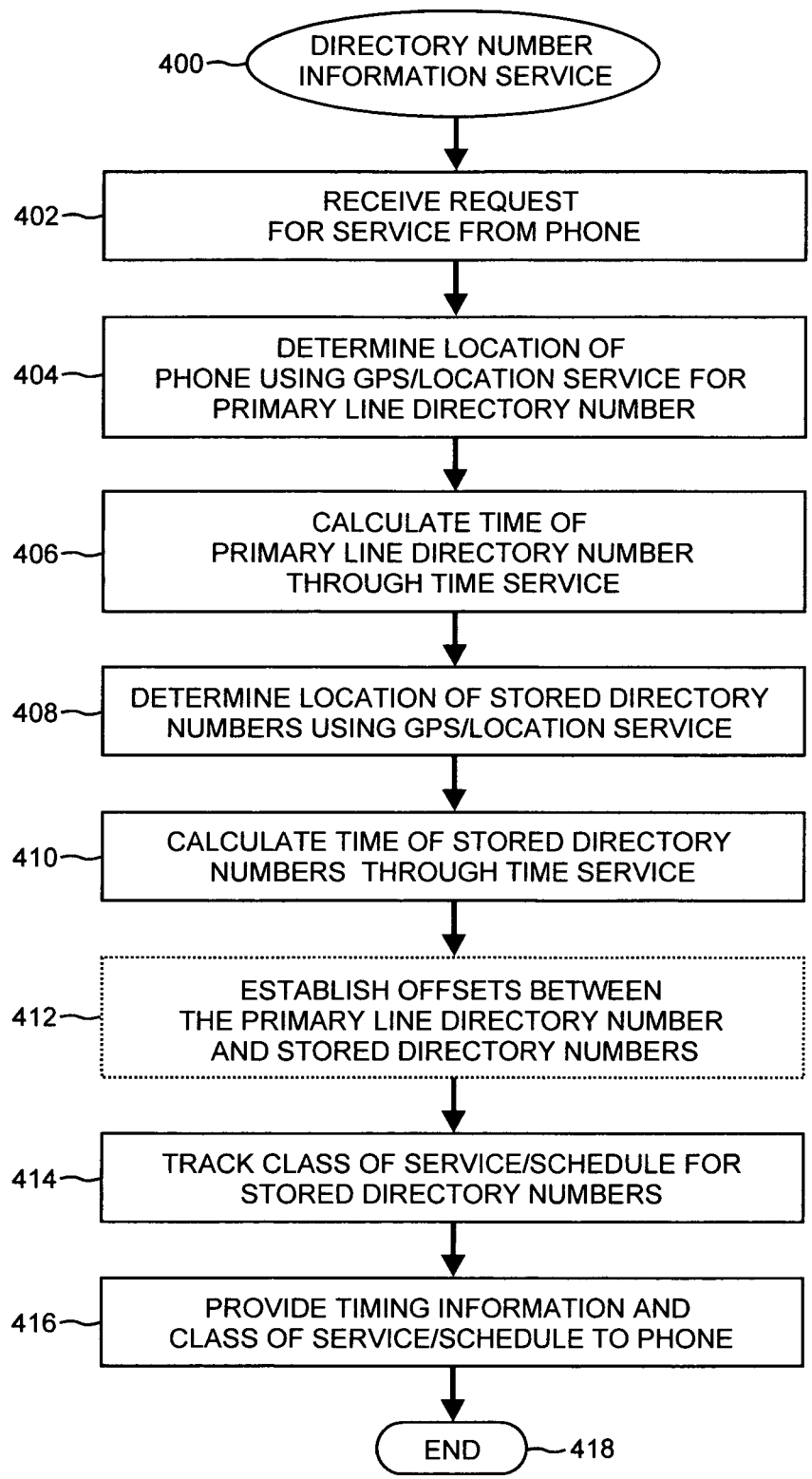
FIG. 4 represents a flow chart showing exemplary processes performed by the directory number information service for retrieving the local time and social status of the parties in accordance with one aspect of the present application.

Now referring to FIG. 4, a flow chart showing exemplary processes performed by the directory number information service 102 for retrieving the local time and social status of the parties in accordance with one aspect of the present application is provided. Those skilled in the relevant art will appreciate that fewer or more processes can be used. The processes can begin at block 400.

At block 402, the directory number information service 102 can receive a request for the local time and social status of remote parties from the phone 104. The communication can include a request for the local time and social status of a single party or can include an information request for multiple parties. The service request can be received over the communication network 108 through standard protocols. The request can include the primary line directory number. In one embodiment, information can be provided by the phone 104 so that the directory number information service 102 can verify the user of the phone 104. Stored directory numbers related to the communication devices 106 can also be received by the directory number information service 102.

At block 404, the directory number information service 102 can determine the location of the phone 104. As shown in FIG. 2, the directory number information service 102 can use the GPS 110 and/or the location service 112. The GPS 110 and location service 112 can be accessed by the directory number information service 102. Known to those skilled in the relevant art, the GPS 110 can determine a location of the phone 104 through satellite systems. The location service 112 can track the phone 104 through GSM localization.

Numerous other methods for detecting the location of the phone 104 are known and can be implemented herein. In one embodiment, the directory number information service 102 can incorporate or be associated with a notification service that determines location changes of the communication devices 106. The notification service can be used so that the location of the communication devices 106 are not pulled when queries are made, which can reduce the amount of processing time for retrieving the local time. In one embodiment, the communication devices 106 can update the notification service of their location without being requested, for example, at start up or at defined time intervals.

The directory number information service 102 can calculate the time of the primary line directory number through the time service 114 at block 406. The location of the phone 104 determined above can be used to calculate the time. While the location was determined first, the location of the phone 104 can be monitored constantly thus removing the need to detect the location of the phone 104. In one embodiment, the phone 104 can send their local time to the directory number information service 102 removing the need for these determinations.

At block 408, the directory number information service 102 can determine the location of the stored directory numbers using the GPS 110 and/or location service 112. The GPS 110 and location service 112 can be accessed by the directory number information service 102. At block 410, the directory number information service 102 can calculate the time of the stored directory numbers through the time service 114.

At optional block 412, which is indicated by the dotted box, the directory number information service 102 can establish offsets between the primary line directory numbers and stored directory numbers. Offsets can also be calculated between the stored directory numbers. The offsets can be used to establish shorter computational times for the phones 104. When time calculations are performed on the phone 104, the phone 104 can take the offsets and use the time on the phone 104 to determine the local times of the communication devices 106.

The directory number information service 102 can track the class of service/schedule 116 for stored directory numbers at block 414. The class of service/schedule 116 can determine the social status of the user operating a communication device 106. In one embodiment, the class of service/schedule 116 can be uploaded with information regarding their social status by the user of the communication device 106. The class of service/schedule 116 can also be determined by managerial or administrative staff. Normal social expectations can also be used when determining the type of class of service/schedule 116.

At block 416, the directory number information service 102 can provide the time information and class of service/schedule 116 to the phone 104. The processes can end at block 418. While the communication was represented as a phone call above, an SMS, MMS, or other telephonic data can be represented as the communication.

Figure 5:
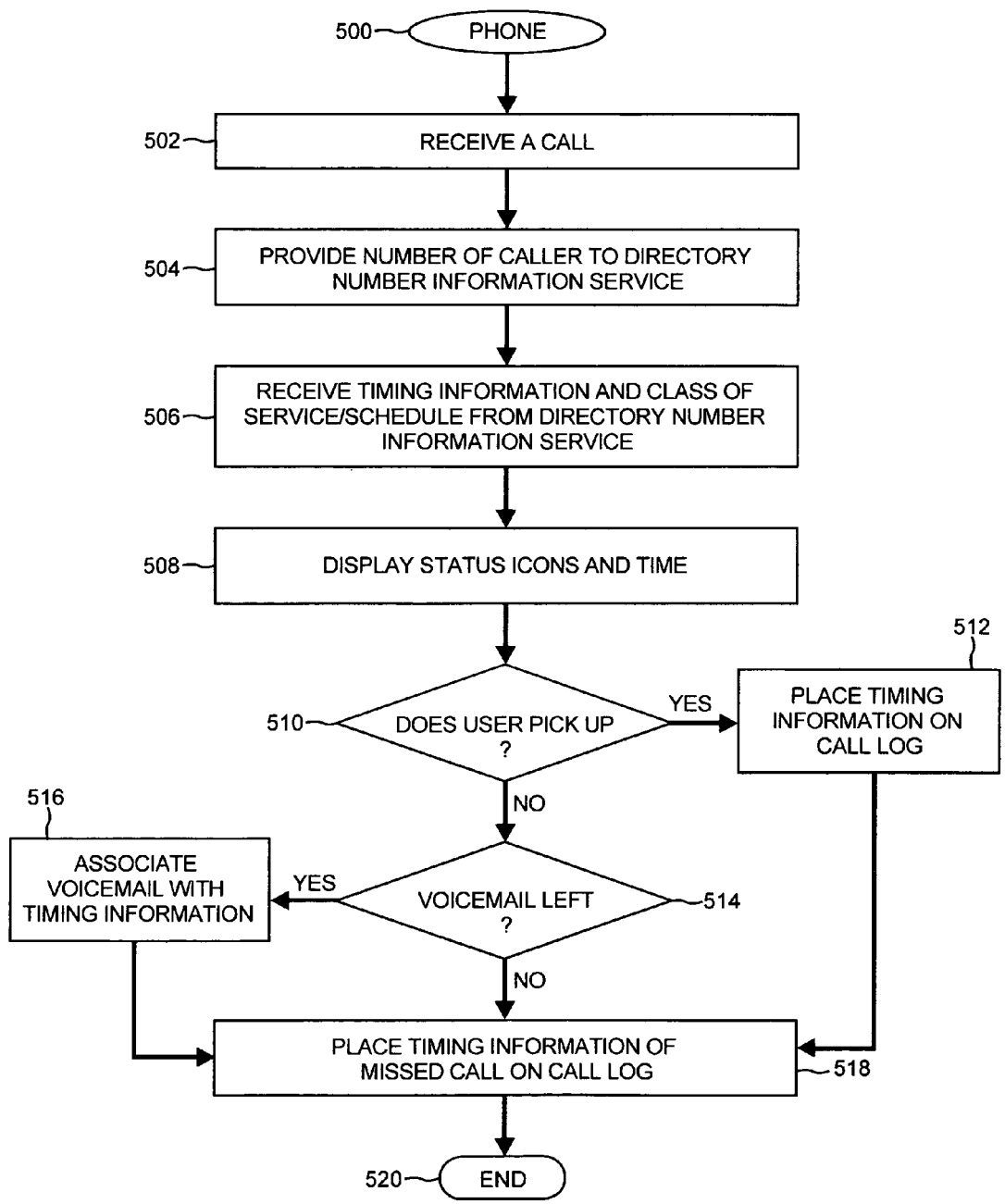
FIG. 5 provides a flow chart showing exemplary processes performed by the phone for tracking incoming calls in accordance with one aspect of the present application.

FIG. 5 provides a flow chart showing exemplary processes performed by the phone 104 for tracking incoming calls in accordance with one aspect of the present application. Those skilled in the relevant art will appreciate that fewer or more processes can be used. The processes can begin at block 500.

At block 502, an incoming call can be received by the phone 104. In one embodiment, the phone 104 can receive another form of communication such as an SMS, MMS, or other data. The phone 104 can provide the number, or user identifier, of the caller to the directory number information service 102 at block 504. Typically, this occurs over the communication network 108. In one embodiment, the service provider of the phone 104 can route the incoming directory number to the directory number information service 102.

At block 506, the phone can receive timing information and class of service/schedule 116 from the directory number information service 102. As shown in FIG. 4, the processes performed therein can be used to retrieve that information. At block 508, the phone 104 can display the status icons and the time of the caller who made the communication.

At decision block 510, a determination can be made on whether the user picks up the incoming call. Missed calls can be a result of the user being away from their phone. The user can also miss a call when they simply decide not to pick up. If the user does pick up their phone 104, the local time referenced at the communication device 106 is placed in a call log at block 512.

When the user does not pick the call up, a determination can be made on whether a voicemail has been left by the calling party at decision block 514. When a voicemail has been left, the timing information retrieved above can be associated with the voicemail at block 516. The phone 104 then places timing information of the missed call on the call log at block 518. The processes can end at block 520.

Figure 6:
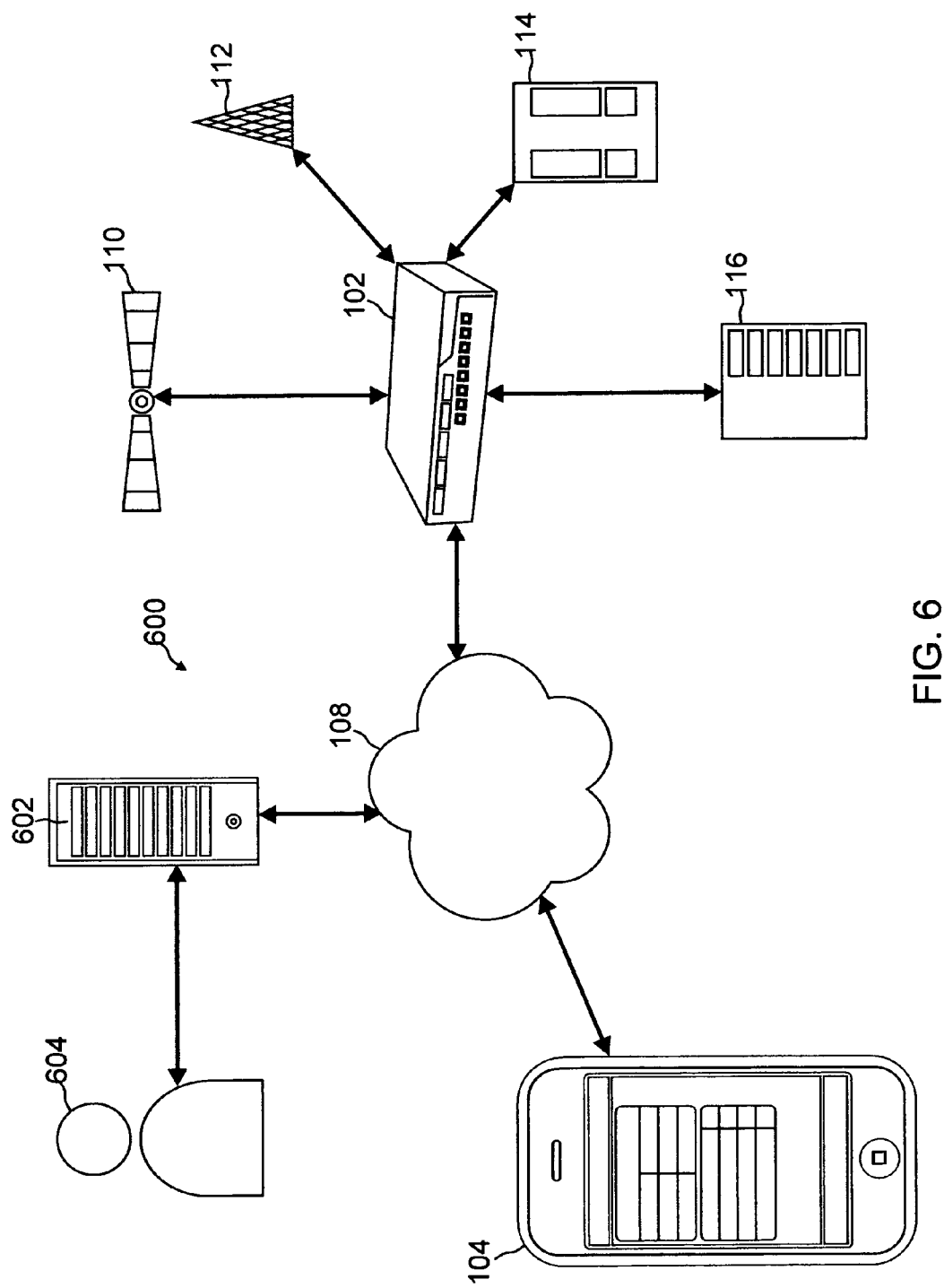
FIG. 6 depicts an exemplary environment for updating software on the phone using the directory number information service in accordance with one aspect of the present application.

With reference now to FIG. 6, an exemplary environment 600 for updating software on the phone 104 using the directory number information service 102 in accordance with one aspect of the present application is provided. Those skilled in the relevant art will appreciate that fewer or more components can be used within the environment 600 and those components described herein are for purposes of illustration.

The phone 104 can communicate with the directory number information service 102 through a communication network 108. The directory number information service 102 can interact with the GPS 110 and/or location service 112, time service 114 and class of service/schedule 116 to provide a local time and status information to the software 602 so it can be determine whether the phone 104 should be updated.

In one embodiment, a manager 604 can determine whether the phone 104 should be updated by the software 602. The manager 604 can specify what times the software 602 can be updated. For example, the manager can specify the phone 104 be updated when an employee is not working. In one embodiment, the user of the phone 104 can specify what times they want the software updates. The software updates can be based on the local time of the phone 104 as well as the user's social status for that phone 104.

Figure 7:
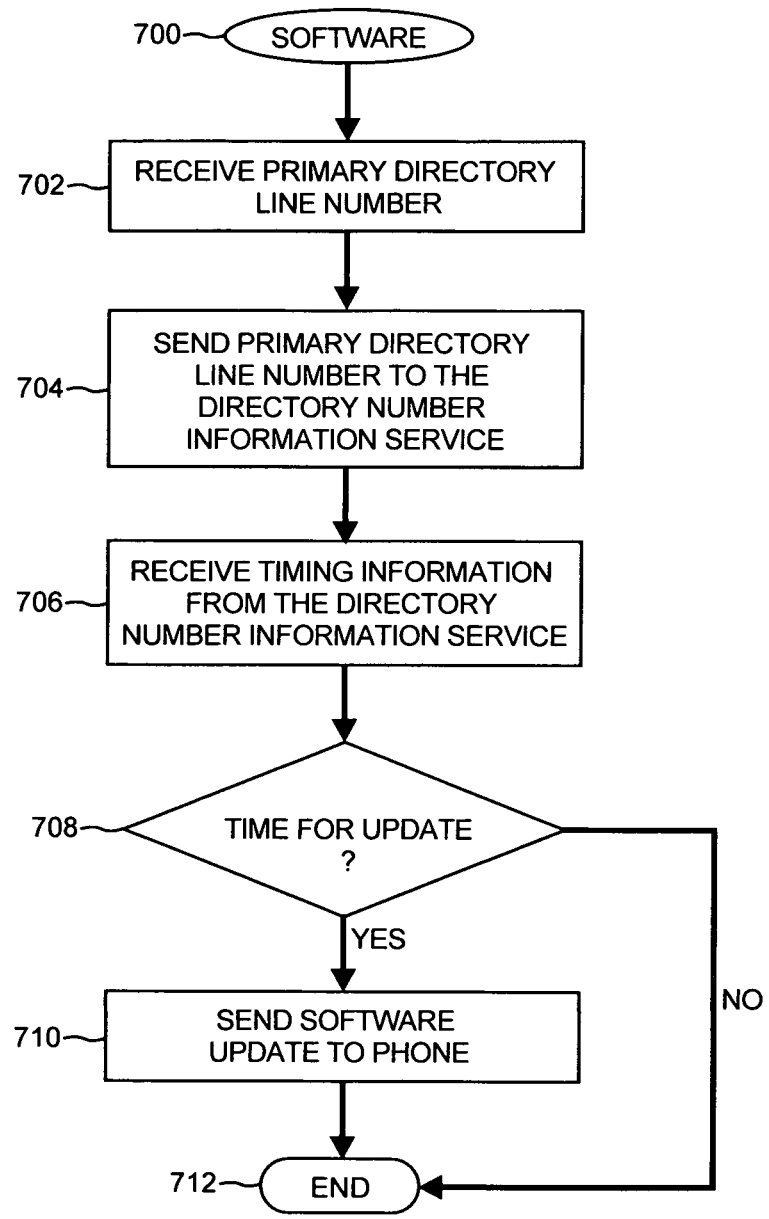
FIG. 7 is a flow chart showing exemplary processes for updating software on the phone in accordance with one aspect of the present application.

FIG. 7 is a flow chart showing exemplary processes for updating software on the phone 104 in accordance with one aspect of the present application. Those skilled in the relevant art will appreciate that fewer or more processes can be used. The processes can begin at block 700.

At block 702, the software 602 can receive the primary directory line number from the phone 104. In one embodiment, the primary directory line number can be received by another entity that alerts the software 602 that an update is required by the phone 104. After receiving the primary directory line number, the software 602 can send the primary directory line number to the directory number information service 102 at block 704.

As shown in FIG. 4, the processes performed by the directory number information service 102 can be used to retrieve information regarding a local time and status of the phone 104. At block 706, the software 602 can retrieve the timing information from the directory number information service 102.

At decision block 708, a determination can be made whether the software on the phone 104 should be updated. This determination can be based on the local time of the phone 104. In one embodiment, the determination can be based on the social status of the user. For example, the social status can indicate that the user of the phone 104 is unavailable for calls during dinner time and allows the software 602 to be updated.

When the local time and/or social status indicates that the phone 104 should not be updated by the software 602, the processes can end at block 712. Alternatively, at block 710 the software 602 can be sent to the phone 104 for updates with the processes ending at block 712.

Beforehand, it was assumed that a directory number could specify a unique device that was associated with a specific user. The location of this device was assumed to be a proxy for the location of the user. Today, users are commonly supplied with a 'one number service' meaning that a number of communication devices can be associated with a user depending on the circumstances. These devices could be an office desk telephone, a cell phone, an in-building wireless telephone, a residence telephone, a hotel telephone, etc. The one number service can have methods to determine which device or devices that are most likely to be used by the user at the time of a call and can ring those devices either in parallel or serial.

To address issues associated with the one number service, the directory number information service 102 previously described above can be replaced or supplemented with the teachings provided in U.S. patent application Ser. No. 12/587,668, titled "SYSTEM AND METHOD FOR LOCATION DETECTION AND MANAGEMENT OF UNCERTAIN INFORMATION THEREOF" by James Midtun and Tom Gray, which is hereby incorporated by reference in its entirety.

In one embodiment, the directory number information service 102 can be enhanced using the GPS location functions taught in the '668 application. As provided for, '668 does not require that the device be turned on to give an estimated location. The GPS location functions can arbitrate between multiple indications of user activity to give the most likely estimate. By using the features of '668 within the present application, estimations of the local times of the communication devices 106 can be provided to the user of the phone 104. In addition, certainty information can be provided.

One number services can typically use a directory number, SIP address, or other unique identifier to identify calls to the user. These identifiers can be used in place of the device directory numbers previously described. '668 provided approximations of a person's location to a number of interested parties wherein the approximations were based upon a detection device's location and inherent inaccuracies related to that detection device. The system evaluated presence information from multiple detectors and approximated the location using and combining that information. Through the system, a location of a person could be determined with a confidence level for that determination. The system could also degrade confidence levels assigned to the location as a function of time.

Each location included a hierarchy of subtypes with each subtype including a precision level, the precision level associated with an accuracy level of a detector involved for placing a person within that particular location. When a detector received presence information, the system would traverse through the locations and their associated precision levels to approximate the correct type of location within the hierarchy using the accuracy level of the detector.

A user's location could be expressed in any number of location type syntaxes. Among the specific syntaxes indicated were <Raw Sensor>, <Political/Physical>, <Enterprise>, and <User/Social>. Each of these syntaxes was used for various types of applications. A representation of a specific user location in the Physical/Political syntax is:

```
<Political/Physical>
    <<Country>><<United States>><<Confidence>><<Certain>>
    <<City>><<New York City>><<Confidence>><< Certain >>
    <<District>><<Midtown>><<Confidence>><< Certain >>
    <<Street>><<350 Fifth Avenue>><<Confidence>><< Certain >>
    <<Building>><<Empire State Building>><<Confidence>>
    << Certain >>
    <<Floor>><<56th>><<Confidence>><< Certain >>
    <<Room>><<56123>><<Confidence>><<Possible>>
```

The Physical/Political syntax provided above can represent the location of a user who is in a room in the Empire State Building. In the present application, the Physical/Political syntax can be of use by providing the local time and social status of a phone 104 or communication device 106 to integrate the information seamlessly. Those skilled in the relevant art will appreciate that other syntaxes can be used especially when physical units of longitude and latitude are used. When combined with the teachings of the present application, the Physical/Political syntax can be the following:

```
<Political/Physical>
    <<Date>><<2009-11-03>>
    <<Time>><<10:11>>
    <<Country>><<United States>><<Confidence>><<Certain>>
    <<City>><<New York City>><<Confidence>><< Certain >>
    <<District>><<Midtown>><<Confidence>><< Certain >>
    <<Street>><<350 Fifth Avenue>><<Confidence>><< Certain >>
    <<Building>><<Empire State Building>><<Confidence>>
    << Certain >>
    <<Floor>><<56th>><<Confidence>><< Certain >>
    <<Room>><<56123>><<Confidence>><<Possible>>
```

Those skilled in the relevant art will appreciate that numerous advantages can be provided by using the syntaxes of '668 with the functions and features provided within the present application. One advantage is the use of the multiple types to identify a user's location. For example, hot desking registration information in its raw form is typically capable of providing only a local indication of a user's location. The system of policies or semantics, as described in '668, can transform the raw data into significant global information. In particular, policies can be provided that transform a locally significant location into a globally significant street address or longitude and latitude. Further, the local time and dates can be developed by applications so that such information can be useable when determining the social status or the like from the raw data.

In addition thereto, the functions and features described herein can be used with location consolidation as provided by '668. The location consolidation can resolve conflicts between multiple location indications from the multiple devices that can be used. To resolve the multiple locations, the location consolidator can select the most accurate possible location based on the attached time and in some embodiments, the social status. This can enable the use of multiple types of location indication.

The location types can also provide a confidence level and an indication of degradation in that confidence, which can be used by features and functions described herein. This can allow the operation of the system at those times when no current indication is available. This can occur for indicators such as hot desking registrations in which the indicator is available intermittently. For indicators such as GPS systems that are constantly available while they are operative, a location determination can be valid when they are switched off. This can be useful for situations such as normal sleeping periods when GPS-equipped devices typically are shut off. A valid estimation of location during these periods can still be obtained.

While '668 provided a context in which the present application can be used, those skilled in the relevant art would appreciate that those facilities do not have to be used. Some embodiments can rely exclusively on the use of GPS-equipped wireless devices.

In accordance with one aspect of the present application, a phone system for providing a local time of a remote party is presented. The phone system can include at least one processor and a memory operatively coupled to the processor, the memory storing program instructions that when executed by the processor, causes the processor to perform processes. The processes can include receiving a user identifier from a phone application identifying a remote party. In addition, the processes can include retrieving a location of the remote party associated with the user identifier. The processes can also include determining a local time of the remote party based on the location. The processes can include providing the local time of the remote party to the phone application for display.

In one embodiment, the user identifier can be a one number identifier of the remote party. In one embodiment, the one number identifier can be associated with the remote party whom operates at least one device. In one embodiment, the phone application can be provided on a mobile phone. In one embodiment, the memory when executed by the processor can cause the processor to retrieve a social status of the remote party and provide the social status to the phone application for display. In one embodiment, the social status can be early morning, morning, afternoon, late afternoon, and night. In one embodiment, the social status can be work, lunch, and outside of work.

In one embodiment, retrieving the location of the remote party associated with the user identifier can include accessing a global positioning system or location service. In one embodiment, determining the local time of the remote party based on the location can include accessing a time service. In one embodiment, the phone application can store a plurality of user identifiers locally.

In one embodiment, the phone can display local times for a plurality of remote parties, the local times determined by locations of the plurality of remote parties. In one embodiment, the memory when executed by the processor can cause the processor to communicate with the phone application through a session initiation protocol. In one embodiment, providing the local time to the phone application for display can include providing a message through the session initiation protocol. In one embodiment, the message can be provided in an extensible markup language document.

In accordance with another aspect of the present application, a system is provided. The system can include a phone for displaying a time of an incoming call from a caller. The phone can connect to a service provider and supply a user identifier corresponding to the caller to the service provider. The service provider can retrieve a location of the caller identified by the user identifier and determine the time of the caller based on the location. The service provider can send the time to the phone for display.

In one embodiment, the phone can display a social status of the caller. In one embodiment, the service provider can retrieve the social status of the caller and provide the social status to the phone for display. In one embodiment, the incoming call can be missed with the time displayed on the phone indicating when the call was missed. In one embodiment, the incoming call can be missed and a voice mail is left, the time displayed on the phone indicating when the voice mail was left.

In accordance with yet another aspect of the present application, a computer-implemented method for providing software updates to communication devices is presented. The method can include receiving a user identifier from a communication device. In addition, the method can include determining a local time of the communication device based on the user identifier. The method can also include providing at least one software update to the communication device when the local time is within a defined time frame.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A phone system for providing local times of parties comprising:
   at least one processor; and
   a memory operatively coupled to said processor, said memory storing program instructions that when executed by said processor, causes said processor to:
     receive a first user identifier and a second user identifier from a phone application, the first user identifier identifying a remote party and the second user identifier identifying a calling party;
     retrieve a location of said remote party;
     determine a local time of said remote party based on said location;
     determine a local time of said calling party;
     provide said local time of said remote party to said phone application for display; and
     provide said local time of said calling party to the remote party for display.

2. The phone system of claim 1, wherein said first user identifier is a one number identifier of said remote party.

3. The phone system of claim 2, wherein said one number identifier is associated with said remote party whom operates at least one device selected from the group consisting of a cellular phone, a smart phone, a softphone, an IP desk phone, a teleworker IP phone, and a residential phone.

4. The phone system of claim 1, wherein said first user identifier is the directory number of a telephone associated with said remote party.

5. The phone system of claim 1, wherein said memory when executed by said processor causes said processor to:
   retrieve a social status of said remote party; and
   provide said social status to said phone application for display.

6. The phone system of claim 5, wherein said social status is selected from the group consisting of early morning, morning, afternoon, late afternoon, and night.

7. The phone system of claim 5, wherein said social status is selected from the group consisting of work, lunch and outside of work.

8. The phone system of claim 1, wherein retrieving said location of said remote party associated with said user identifier comprises accessing a global positioning system or location service.

9. The phone system of claim 1, wherein determining said local time of said remote party based on said location comprises accessing a time service.

10. The phone system of claim 1, wherein said phone application stores a plurality of user identifiers locally.

11. The phone system of claim 1, wherein said phone displays local times for a plurality of remote parties, said local times determined by locations of said plurality of remote parties.

12. The phone system of claim 1, wherein said memory when executed by said processor causes said processor to communicate with said phone application through a session initiation protocol.

13. The phone system of claim 12, wherein providing said local time to said phone application for display comprises providing a message through said session initiation protocol.

14. The system of claim 13, wherein said message is provided in an extensible markup language document.

15. The phone system of claim 1, wherein said second user identifier is the primary line directory number of a telephone associated with said calling party.

* * * * *